(12) United States Patent
Rojas et al.

(10) Patent No.: US 11,103,809 B2
(45) Date of Patent: Aug. 31, 2021

(54) OIL AND AQUEOUS PHASE SEPARATOR

(71) Applicants: YPF TECNOLOGÍA S. A., Ciudad Autónoma de Buenos Aires (AR); Juan Carlos Soria, Ciudad Autónoma de Buenos Aires (AR)

(72) Inventors: Graciela Rojas, Pcia. de Buenos Aires (AR); María Elena Oneto, Pcia. de Buenos Aires (AR); Nuria Carolina Vidal, Pcia. de Buenos Aires (AR)

(73) Assignees: YPF Tecnologia S.A., Ciudad Autonoma de Buenos Aires (AR); Juan Carlos Soria, Ciudad Autonoma de Buenos Aires (AR)

( * ) Notice: Subject to any disclaimer, the term of this patent is extended or adjusted under 35 U.S.C. 154(b) by 0 days.

(21) Appl. No.: 16/969,138

(22) PCT Filed: Feb. 12, 2019

(86) PCT No.: PCT/IB2019/051123
§ 371 (c)(1),
(2) Date: Aug. 11, 2020

(87) PCT Pub. No.: WO2019/155443
PCT Pub. Date: Aug. 15, 2019

(65) Prior Publication Data
US 2021/0039018 A1    Feb. 11, 2021

Related U.S. Application Data

(60) Provisional application No. 62/629,374, filed on Feb. 12, 2018.

(51) Int. Cl.
*E02B 15/10*      (2006.01)
*B01D 17/12*      (2006.01)
(Continued)

(52) U.S. Cl.
CPC .............. *B01D 17/12* (2013.01); *B01D 17/02* (2013.01); *B01D 17/0214* (2013.01);
(Continued)

(58) Field of Classification Search
CPC ...... E02B 15/045; E02B 15/10; E02B 15/106; B01D 17/02; B01D 17/0214; B01D 17/08; B01D 17/10; C02F 1/40
(Continued)

(56) References Cited

U.S. PATENT DOCUMENTS 3,667,608 A   6/1972  Burroughs et al.
3,670,896 A   6/1972  Hale, Jr. et al.
(Continued)

FOREIGN PATENT DOCUMENTS

EP          2641642 A1    9/2013

*Primary Examiner* — Christopher Upton
(74) *Attorney, Agent, or Firm* — Muncy, Geissler, Olds & Lowe, P.C.

(57) ABSTRACT

Oil and aqueous phase separator device comprising: a basket that comprises a frame having a plurality of supporting arms and fitting means for linking to other phase separator devices; a top lid of the basket; a hydrophobic mesh linked to the basket and supported by the plurality of supporting arms; a plurality of floats linked to the frame of the basket; a housing for an additional float formed on the upper edge of the frame of the basket; and discharging means linked to the basket.

20 Claims, 13 Drawing Sheets

(51) Int. Cl.
- *B01D 17/02* (2006.01)
- *C02F 1/40* (2006.01)
- *E02B 15/04* (2006.01)
- *B01D 17/00* (2006.01)

(52) U.S. Cl.
CPC .............. *B01D 17/10* (2013.01); *C02F 1/40* (2013.01); *E02B 15/045* (2013.01); *E02B 15/10* (2013.01); *E02B 15/106* (2013.01)

(58) Field of Classification Search
USPC .......... 210/122, 170.05, 242.1, 242.3, 242.4, 210/747.6, 776, 923, 924
See application file for complete search history.

(56) References Cited

U.S. PATENT DOCUMENTS

| | | | | |
|---|---|---|---|---|
| 3,690,463 | A | * | 9/1972 | O'Brien .............. E02B 15/106 210/242.3 |
| 3,745,115 | A | * | 7/1973 | Olsen .................. E02B 15/106 210/776 |
| 3,831,756 | A | * | 8/1974 | Bhuta .................. E02B 15/106 210/242.3 |
| 3,912,635 | A | | 10/1975 | Degobert et al. |
| 4,172,039 | A | * | 10/1979 | Akiyama .............. E02B 15/06 210/242.4 |
| 4,243,529 | A | * | 1/1981 | Strauss ................ E02B 15/106 210/242.1 |
| 5,118,412 | A | * | 6/1992 | Schmidt .............. E02B 15/106 210/122 |
| 2007/0138080 | A1 | * | 6/2007 | Clukies ................ B63B 17/06 210/242.3 |
| 2015/0292174 | A1 | * | 10/2015 | Hong .................... C02F 1/001 210/170.05 |

* cited by examiner

OIL AND AQUEOUS PHASE SEPARATOR

FIELD OF THE INVENTION

The present invention refers to a device for separating oil and aqueous phases from their mixtures, especially useful for its application in the oil industry.

BACKGROUND OF THE INVENTION

It is well known the severe environmental damage an oil spill can cause in bodies of water to both fauna and flora as well as to other living organisms and the high costs involved in the removal of oil in these bodies of water. It is therefore vitally important to contain any possible spill as soon as possible in order to substantially reduce said environmental damage, recover the contaminated body of water and avoid incurring high removal and clean-up costs. In addition, it is also important for the oil industry to be able to separate oil and hydrocarbon derivatives thereof from water in order not only to clean the water but also to prepare the oil for subsequent refining.

There are devices disclosed in the prior art that allow the removal of oil and recovery of bodies of water such as that disclosed in U.S. Pat. No. 3,667,608 A, which discloses a device consisting of a plastic pipe wrapped with a layer of a fibrous polyolefin. Said plastic pipe is held by at least one boat so as to sweep the surface of the oil spill contaminated area. The polyolefin layer, due to its great affinity for hydrocarbons, will be responsible for absorbing the oil which will then be conveyed to a tank by means of a pump. Regarding drawbacks, said device presents mainly its difficult handling, the requirement of at least one boat and the poor versatility regarding the geometry or configuration it can adopt.

Additionally, U.S. Pat. No. 3,670,896 A discloses a collection member having its surface coated with a oleophilic and hydrophobic material. The oil is removed by the adsorption of the oil to the surface of the collection member. Said collection member may be in the form of a drum which rotates over the oil contaminated water surface or a conveyor belt which enters and exits the contaminated water surface. The device according to said patent has disadvantages such as having many movable parts which leads to greater wear and need for maintenance, in addition to requiring a high energy consumption.

EP Patent No. 2 641 642 B1 discloses a device comprising an oil gathering chamber covered by a porous, oleophilic and hydrophobic layer which allows obstruction of water outside said layer due to large interface tension allowing a small quantity of water or none to penetrate, and allowing the penetration of oil towards said chamber. Said layer is an accumulation of precoated silicon sand which is formed by mixing and curing the silicon sand with a oleophilic and hydrophobic resin. The device according to this patent can be combined with other devices, for example by means of a steel wire or thin ropes. Regarding drawbacks, the device presents mainly its poor versatility regarding the geometry it can adopt.

Consequently, there is a need of having a device that allows the removal of oil and hydrocarbon derivatives thereof from a body of water, that can adopt different geometric configurations, being easy to handle and economical.

BRIEF DESCRIPTION OF THE INVENTION

Based on the above considerations, the present invention provides a novel device for the separation of mixtures of an oil phase and an aqueous phase, based on a hydrophobic membrane, with improved separation properties, extremely versatile and capable of being assembled or joined to other similar devices for covering a body of water containing an immiscible in water, for example an oily or organic phase, such as oil or hydrocarbon derivatives thereof, said device being specially suitable for removing hydrocarbons from tanks and pools containing contaminated aqueous bodies as well as for oil spill containment on aqueous surfaces, and also being easily scalable as necessary.

Therefore, it is an object of the present invention an oil and aqueous phase separator device comprising:

a basket comprising a frame having an upper edge defining an upper opening in the basket, the frame comprising a plurality of supporting arms and fitting means for linking to other phase separator devices;

a lid for closing the upper opening of the basket;

a hydrophobic mesh linked to the basket and supported by the plurality of supporting arms;

a plurality of floats linked to the frame of the basket;

a housing for an additional float formed on the upper edge of the frame of the basket; and discharging means linked to the basket.

In an embodiment of the invention, the lid for closing the upper opening and the frame of the basket comprise a horizontal cross section similarly or equally shaped as a polygon, preferably as an hexagon.

In an embodiment of the invention, the lid for closing the upper opening has an outer convex surface.

In a preferred embodiment of the invention, the lid for closing the upper opening comprises, on the outer surface, a plurality of protrusions.

In a more preferred embodiment of the invention, each vertex of the polygon comprises one of said protrusions which have similar or different sizes.

In an embodiment of the invention, the plurality of supporting arms comprise a supporting arm at each vertex of the polygon.

In a preferred embodiment of the invention, each supporting arm is slightly downwardly curved forming a concavity with respect to the lid, the supporting arms joining together at the central axis of the device.

In a preferred embodiment of the invention, each supporting arm has an internal grooved channel.

In a preferred embodiment of the invention, the discharging means is located at the central axis of the device, where the supporting arms join together.

In an embodiment of the invention, the material forming the lid for closing the upper opening of the basket, the basket material and the plurality of floats material is a plastic material comprising a polymer selected from the group comprising polyethylene, polypropylene, polystyrene, expanded polystyrene, polyvinyl chloride, polyamide and ethylene glycol polyterephthalate, among others.

In an embodiment of the invention, the basket, as a whole, is manufactured as a single piece by means of a plastic injection process.

In an embodiment of the invention, the hydrophobic mesh is linked to the basket by embedding it during the plastic material injection process, without using adhesives or thermoforming processes.

In a preferred embodiment of the invention, the hydrophobic mesh comprises a metallic mesh coated with an hydrophobic substance. Said hydrophobic substance comprising substances repelling water or immiscible with water, like compounds with hydrocarbon chains selected from the group comprising silicones, preferably polydimethylsiloxane; polyolefins; and fluoropolymers, preferably polytetrafluoroethylene.

In a preferred embodiment of the invention, the plurality of supporting arms support the hydrophobic mesh in a suitable way and position to form an oil phase receiving concavity.

In an embodiment of the invention, the fitting means comprise male and female connectors located each other in an alternate pattern in every one of the outer lateral surfaces of the basket frame.

In a preferred embodiment of the invention, the male connector consists of a protrusion shaped as a solid cylinder and the female connector consists of a protrusion shaped as a hollow cylinder with a lengthwise opening, so as to form a hook.

In another preferred embodiment of the invention, the male connector consists of a protrusion with substantially spheroidal shape and the female connector consists of a cavity to hold said substantially spheroidal protrusion.

In another preferred embodiment of the invention, at least one of the supporting arms comprises a fin-shaped protrusion on its lower surface. Preferably each supporting arm comprises a fin-shaped protrusion and yet more preferably the fin-shaped protrusions are located on non-adjacent supporting arms.

In an embodiment of the invention, at least one of the polygon vertices formed by the frame comprises a float, preferably each vertex of the polygon comprises a float.

In an embodiment of the invention, each one of the plurality of floats comprises a curved body with upper and lower horizontal surfaces.

In another embodiment of the invention, each one of the plurality of floats comprises a downwardly tilted body towards the central axis of the device.

In an embodiment of the invention, the floats are connected to the basket by means of a mechanical coupling or adhesives resistant to the oil phase and to the aqueous phase.

In a preferred embodiment of the invention, the phase separator device is linked to other similar or equal phase separator devices, by means of the fitting means, so as to form a plurality of phase separator devices linked to each other, where said plurality may comprise a number of 2, 3, 4, 5, 6, 7, 8, 9, 10, 11 or more phase separator devices.

BREVE DESCRIPCIÓN DE LAS FIGURAS

Figure 1:
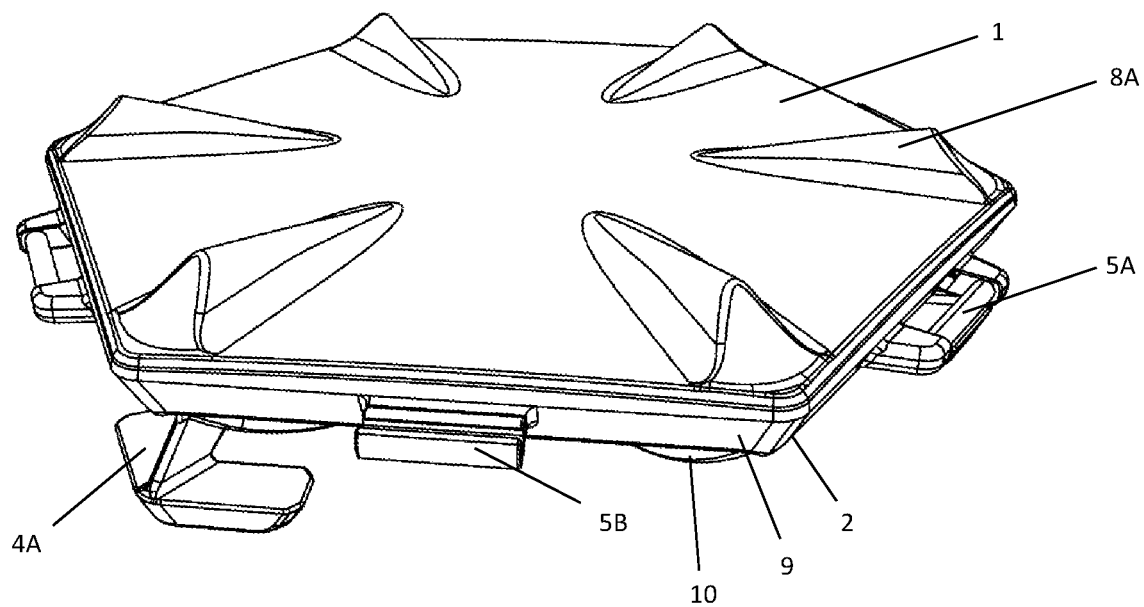
FIG. 1 is a top perspective view of an embodiment by way of example of the phase separator device of the present invention.
Figure 2:
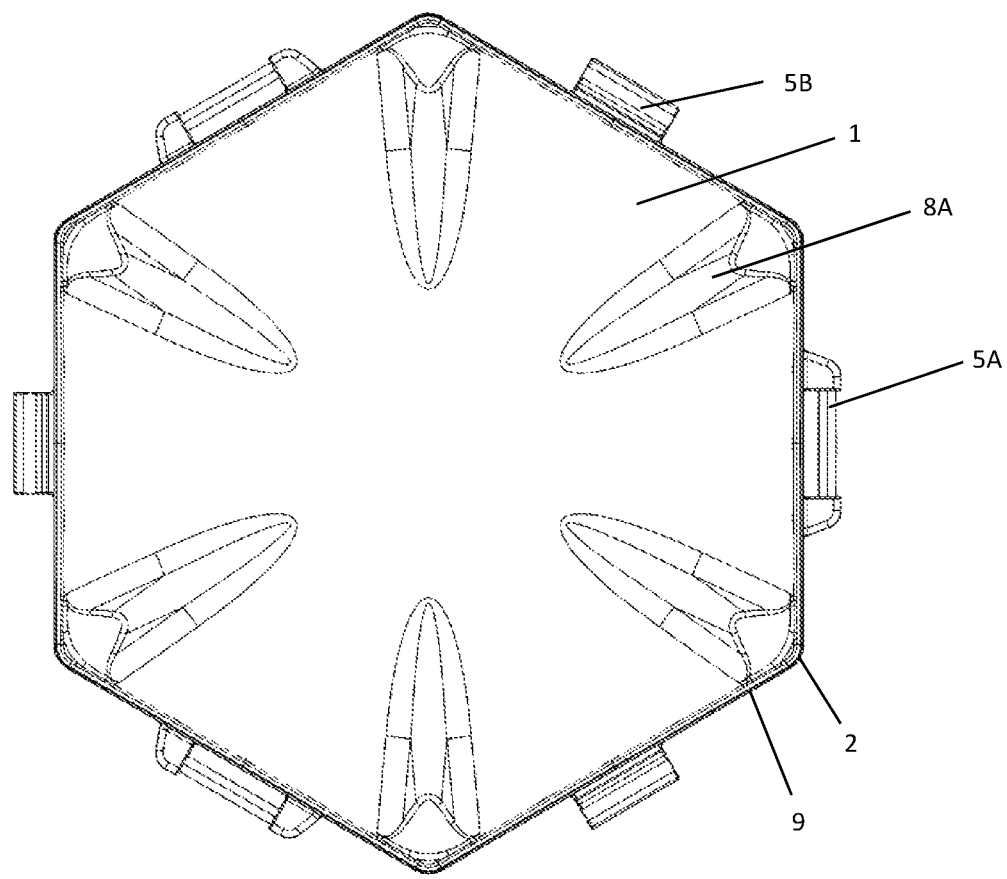
FIG. 2 is a top plan view of the embodiment by way of example of the phase separator device of FIG. 1.
Figure 3:
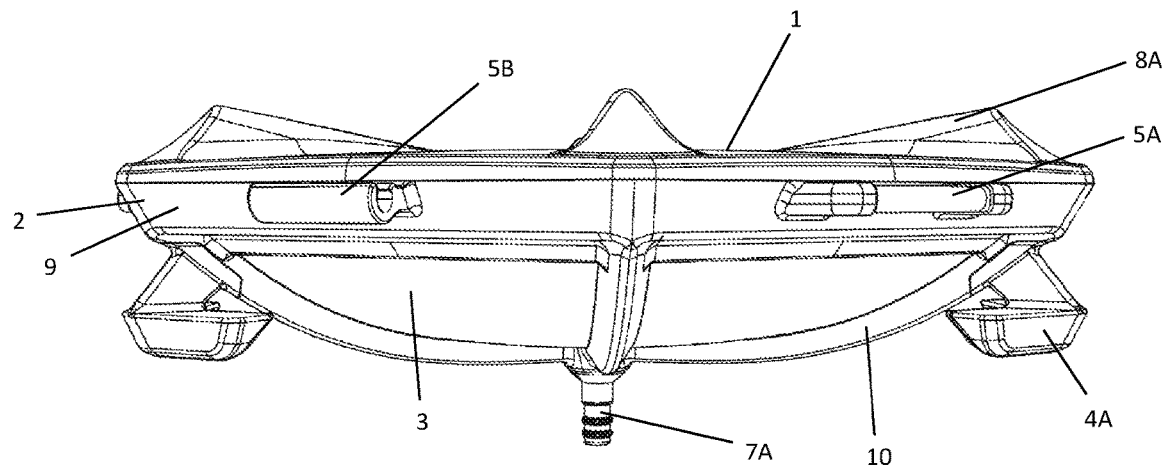
FIG. 3 is a side elevation view of the embodiment by way of example of the phase separator device of FIG. 1.
Figure 4:
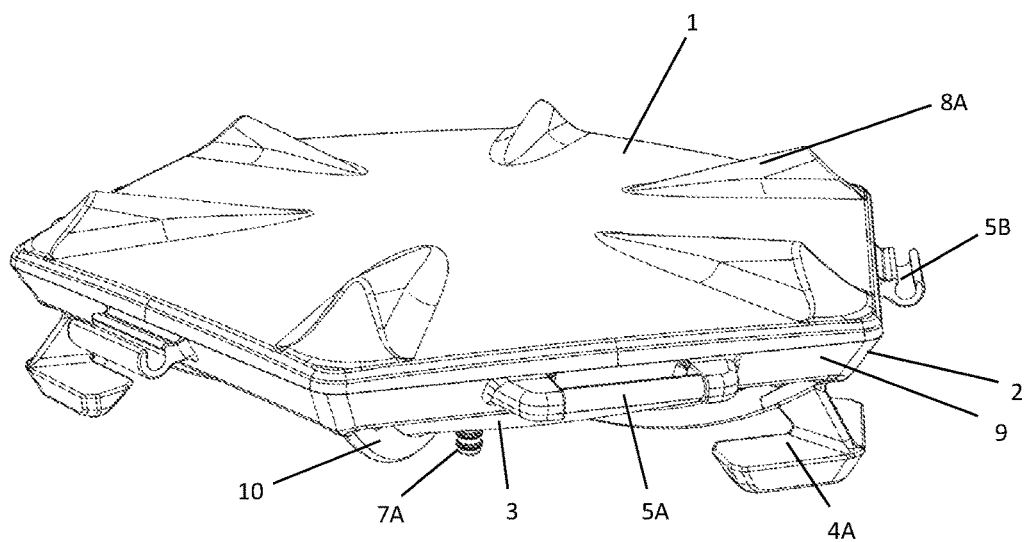
FIG. 4 is another top perspective view of the embodiment by way of example of the phase separator device of FIG. 1.
Figure 5:
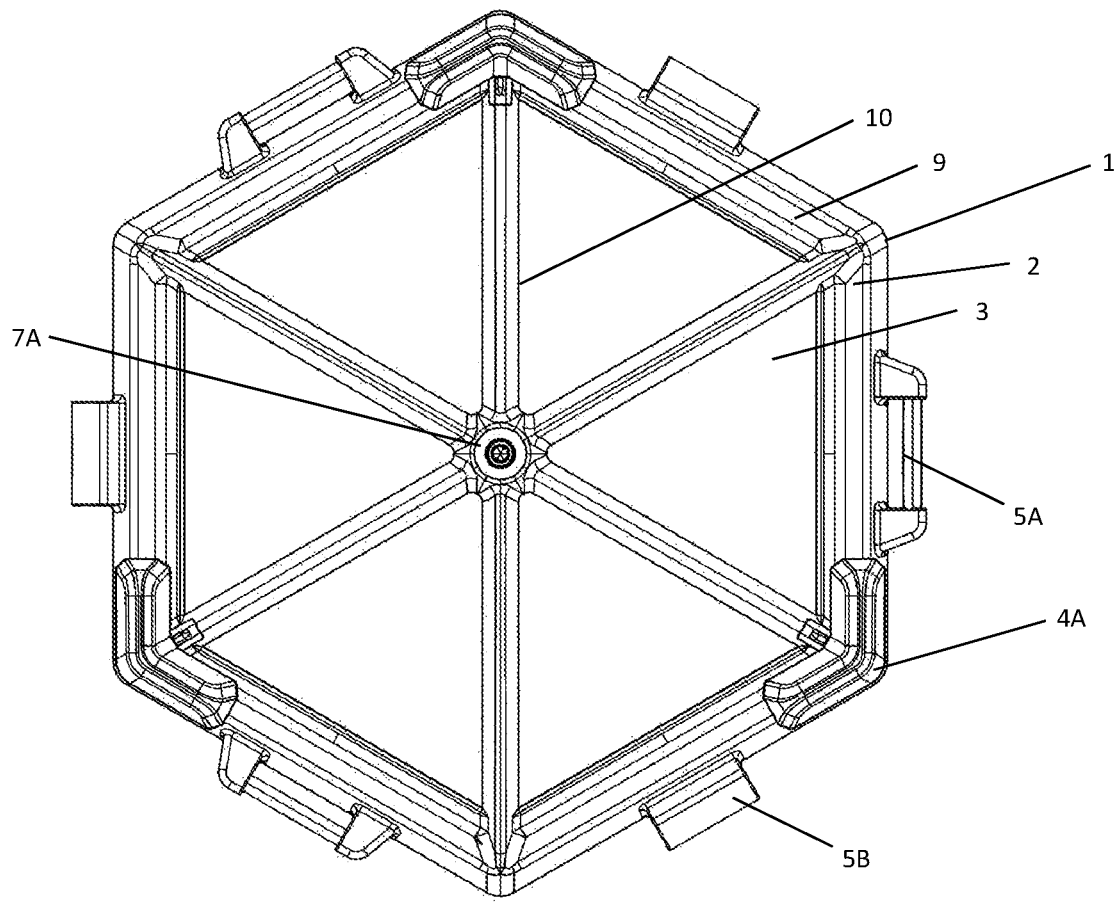
FIG. 5 is a bottom view of the embodiment by way of example of the phase separator device of FIG. 1.
Figure 6:
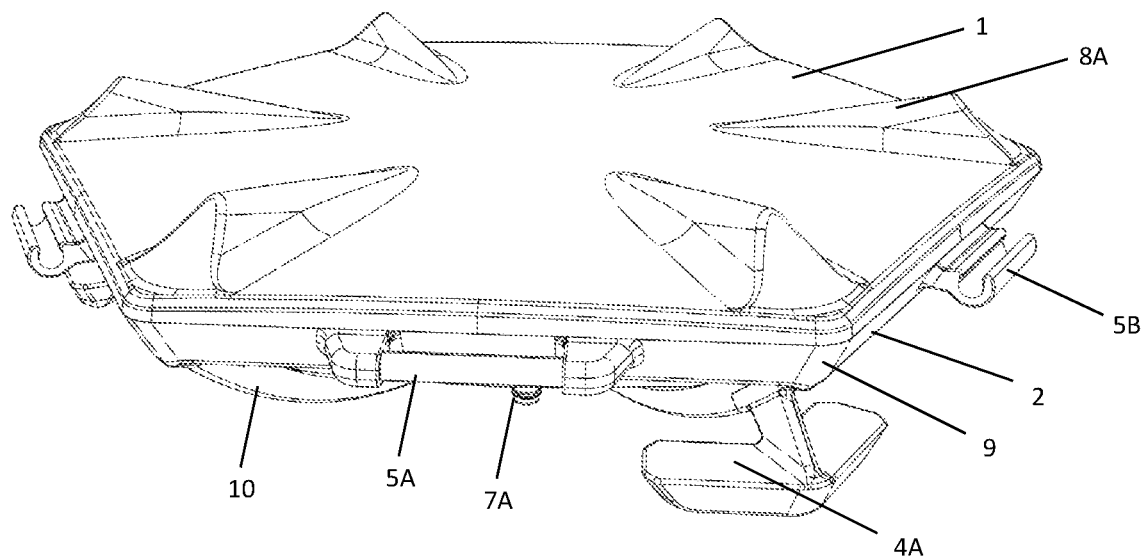
FIG. 6 is another top perspective view of the embodiment by way of example of the phase separator device of FIG. 1.
Figure 7:
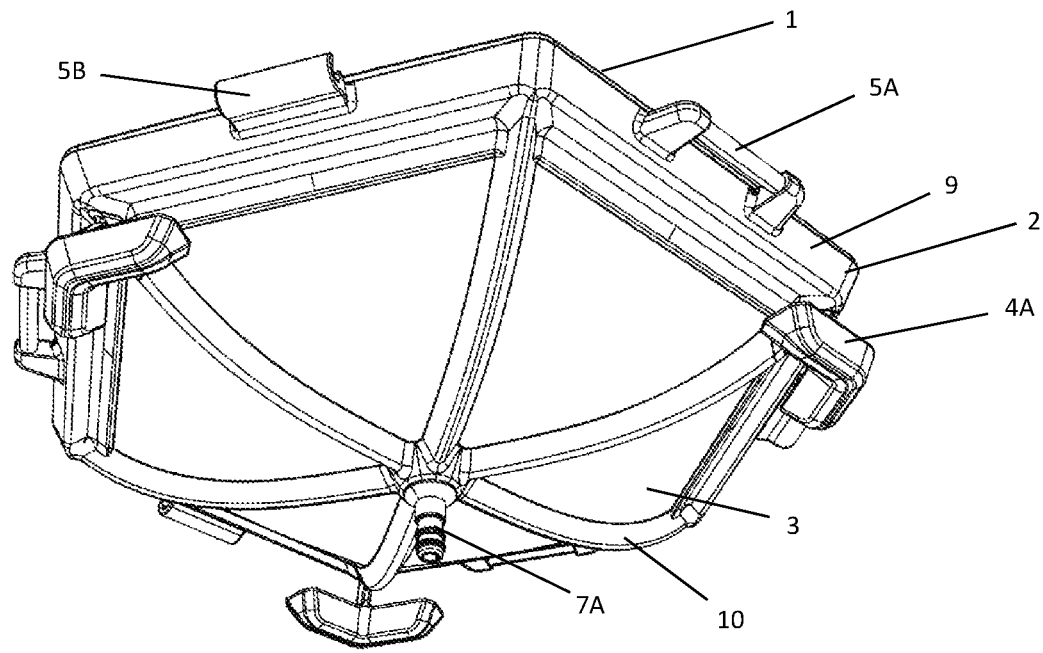
FIG. 7 is a bottom perspective view of the embodiment by way of example of the phase separator device of FIG. 1.
Figure 8:
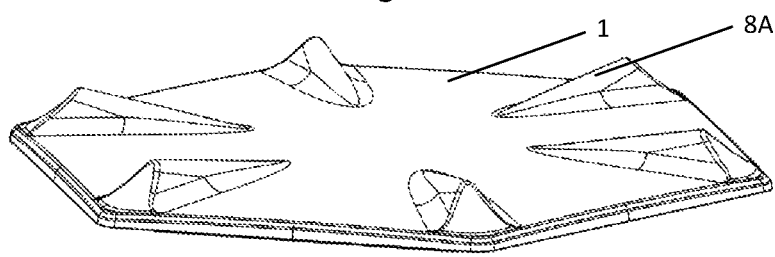
FIG. 8 is a top perspective exploded view of the embodiment by way of example of the phase separator device of FIG. 1.
Figure 8:
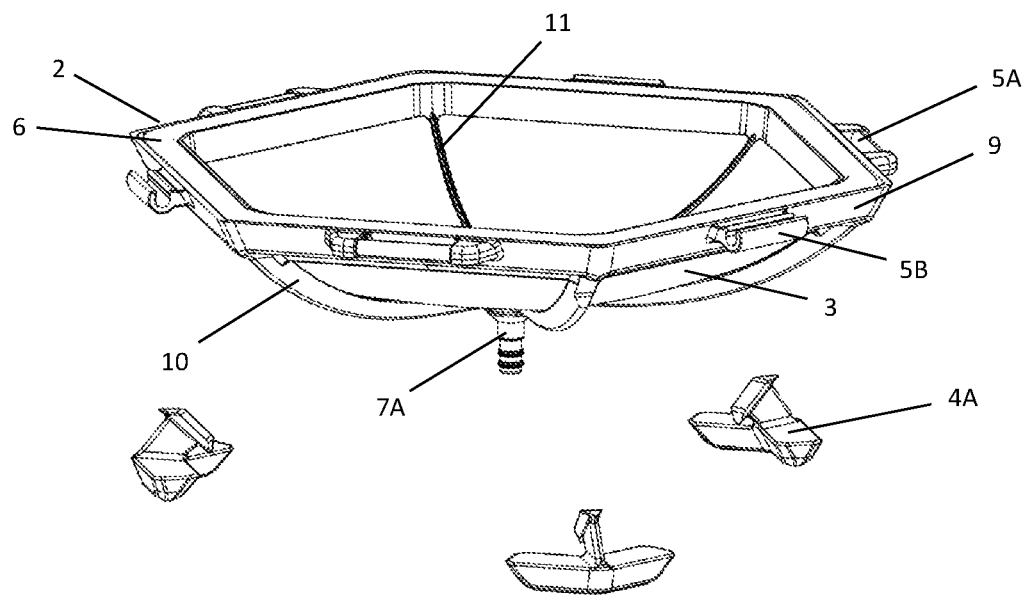
Figure 13:
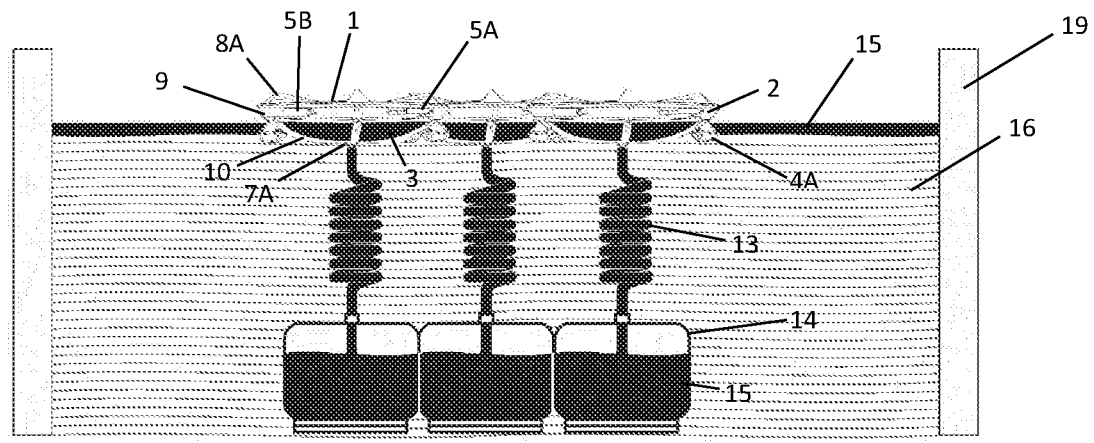
Figure 14:
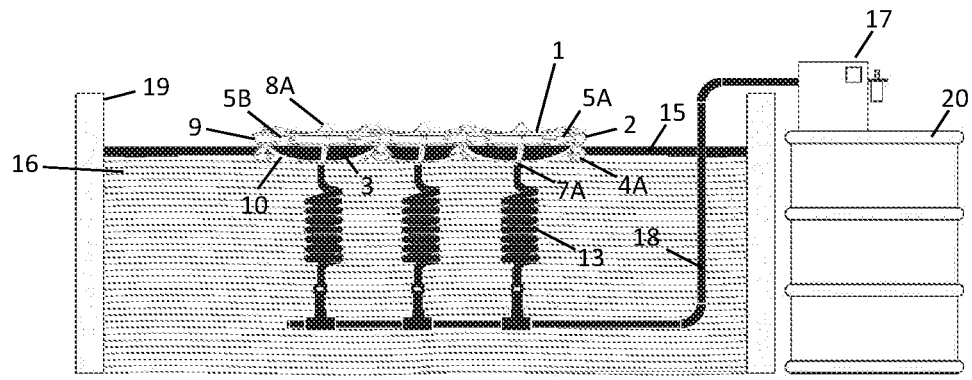

FIG. 13 is a side elevation view of a way of use of the phase separator device of FIG. 1, where three phase separator devices of FIG. 1 are shown assembled together over a body of water containing an oil phase inside a pool, and discharging each of them said oil phase into lower tanks by means of a hose FIG. 14 is a side elevation view of a way of use of the phase separator device of FIG. 1, where three phase separator devices of FIG. 1 are shown assembled together, over a body of water containing an oil phase inside a pool, and discharging each of them said oil phase into an external tank by means of hoses, piping and pumps.

Figure 15:
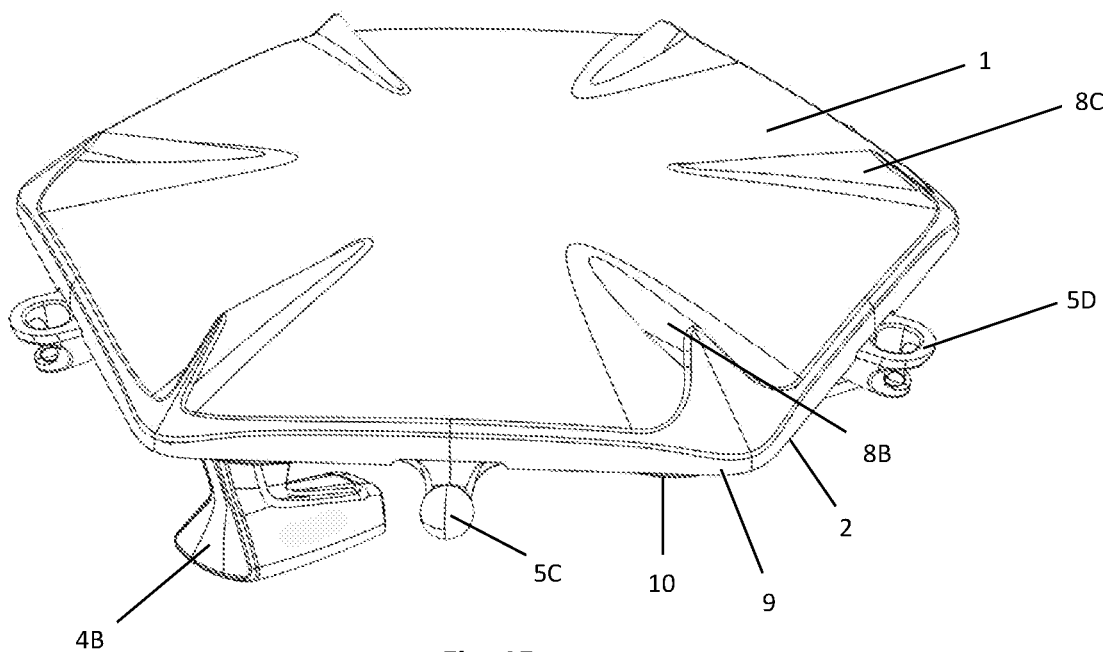

FIG. 15 is a top perspective view of another embodiment by way of example of the phase separator device of the present invention.

Figure 16:
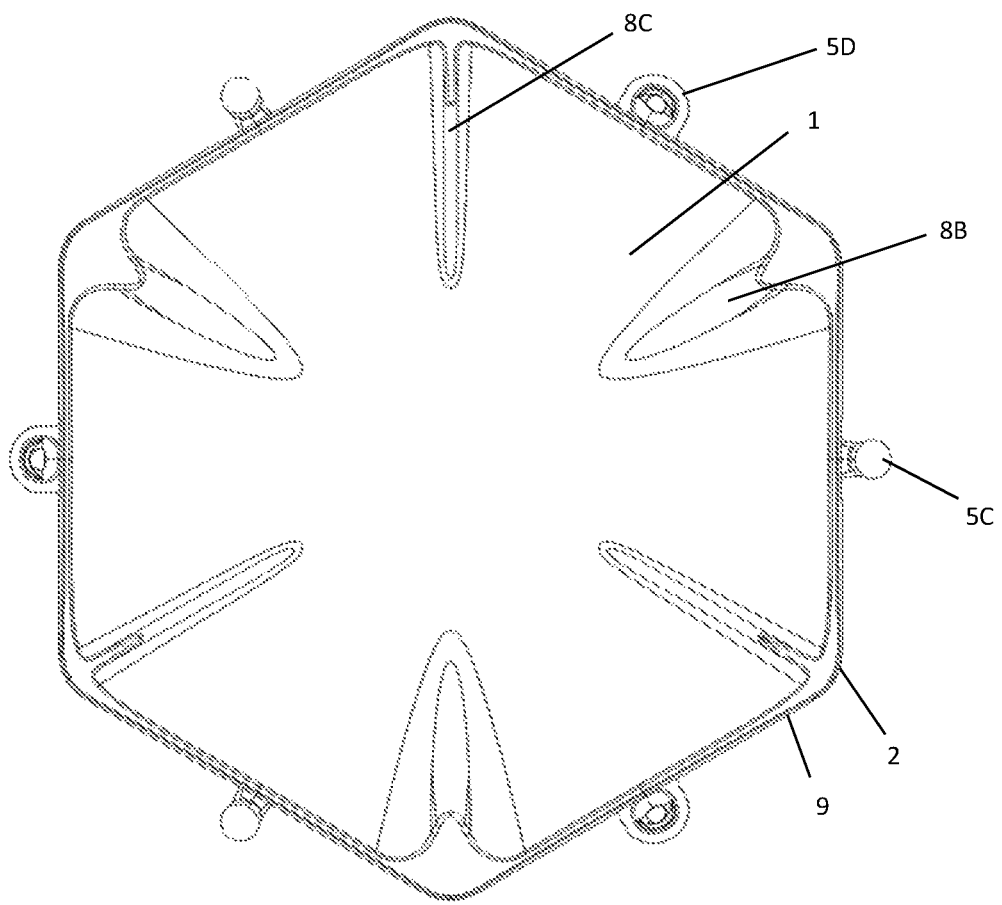

FIG. 16 is a top plan view of the embodiment by way of example of the phase separator device of FIG. 15.

Figure 17:
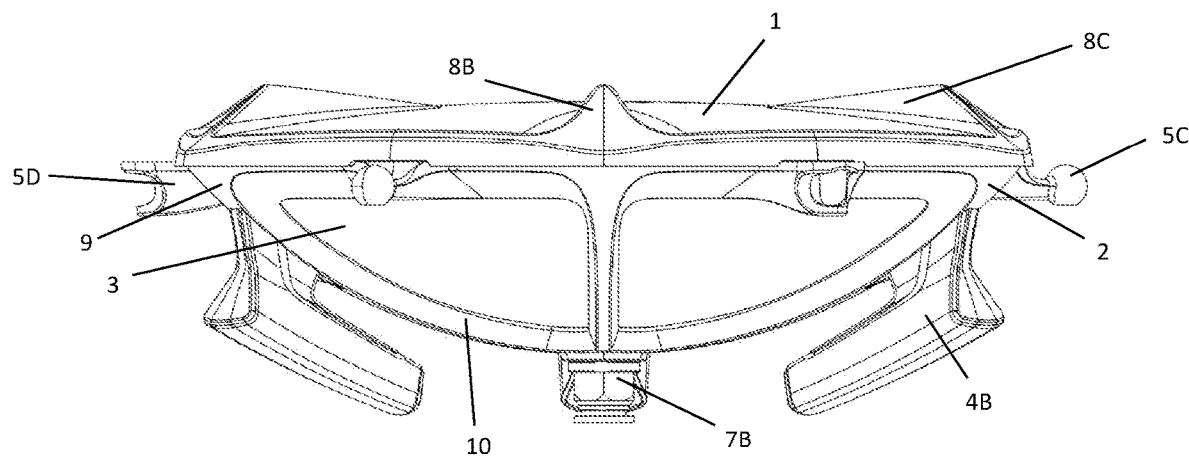

FIG. 17 is a side elevation view of the embodiment by way of example of the phase separator device of FIG. 15.

Figure 18:
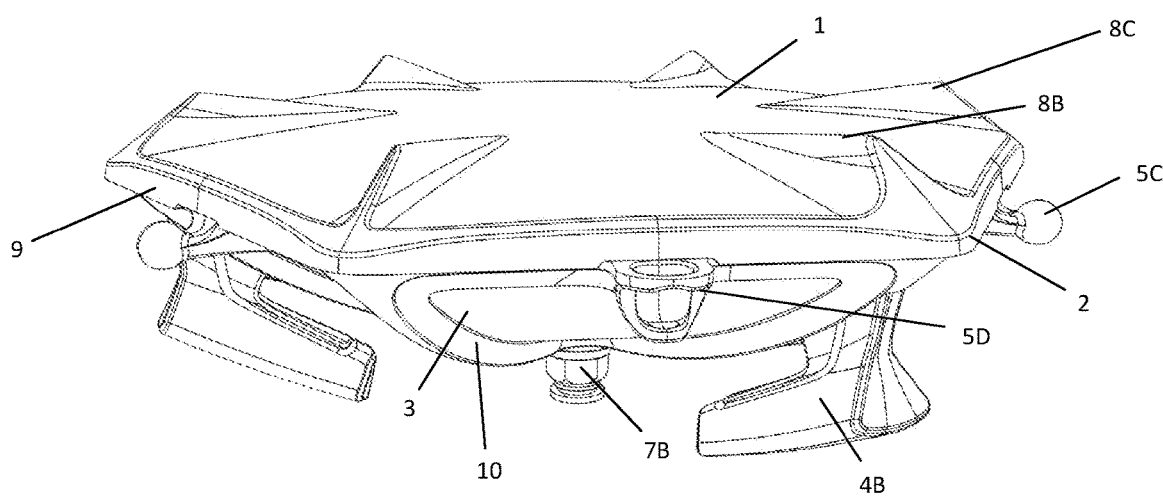

FIG. 18 is another top perspective view of the embodiment by way of example of the phase separator device of FIG. 15.

Figure 19:
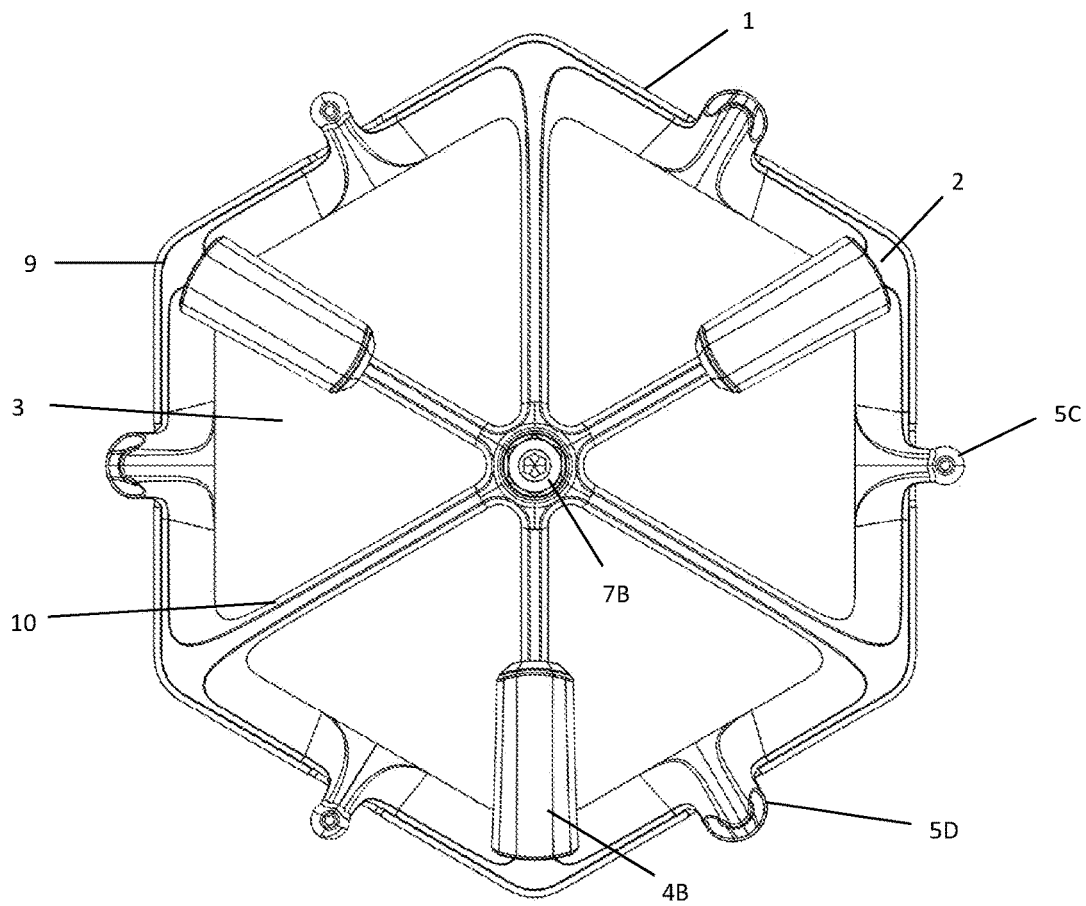

FIG. 19 is a bottom view of the embodiment by way of example of the phase separator device of FIG. 15.

Figure 20:
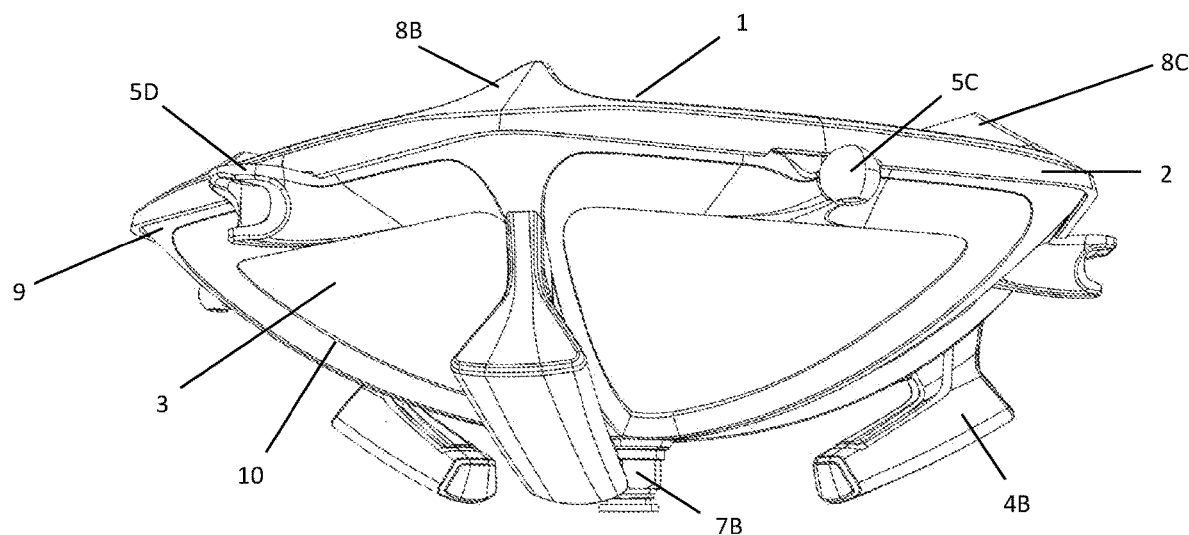

FIG. 20 is a bottom perspective view of the embodiment by way of example of the phase separator device of FIG. 15.

Figure 21:
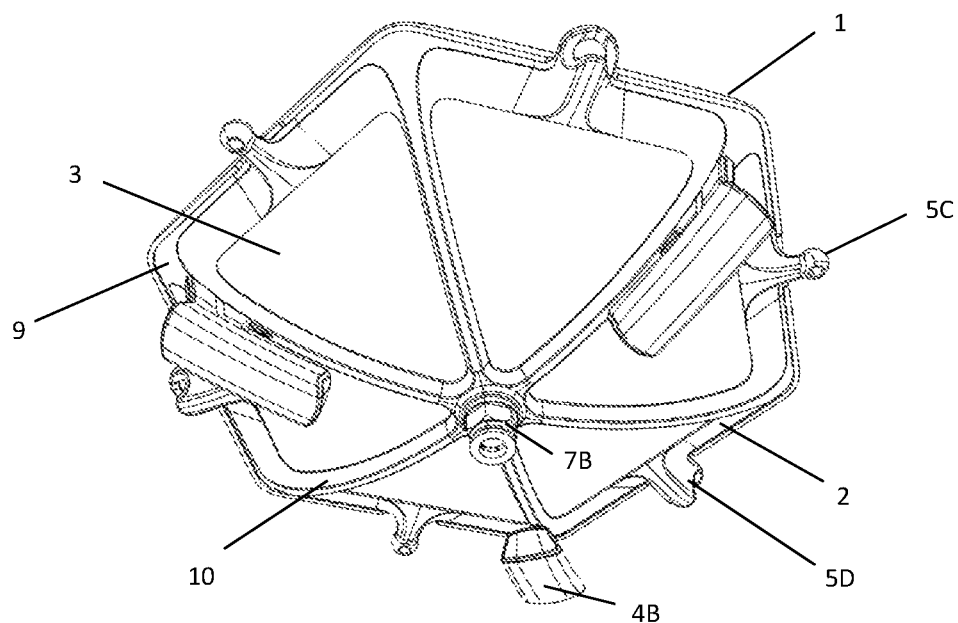

FIG. 21 is another bottom perspective view of the embodiment by way of example of the phase separator device of FIG. 15.

Figure 22:
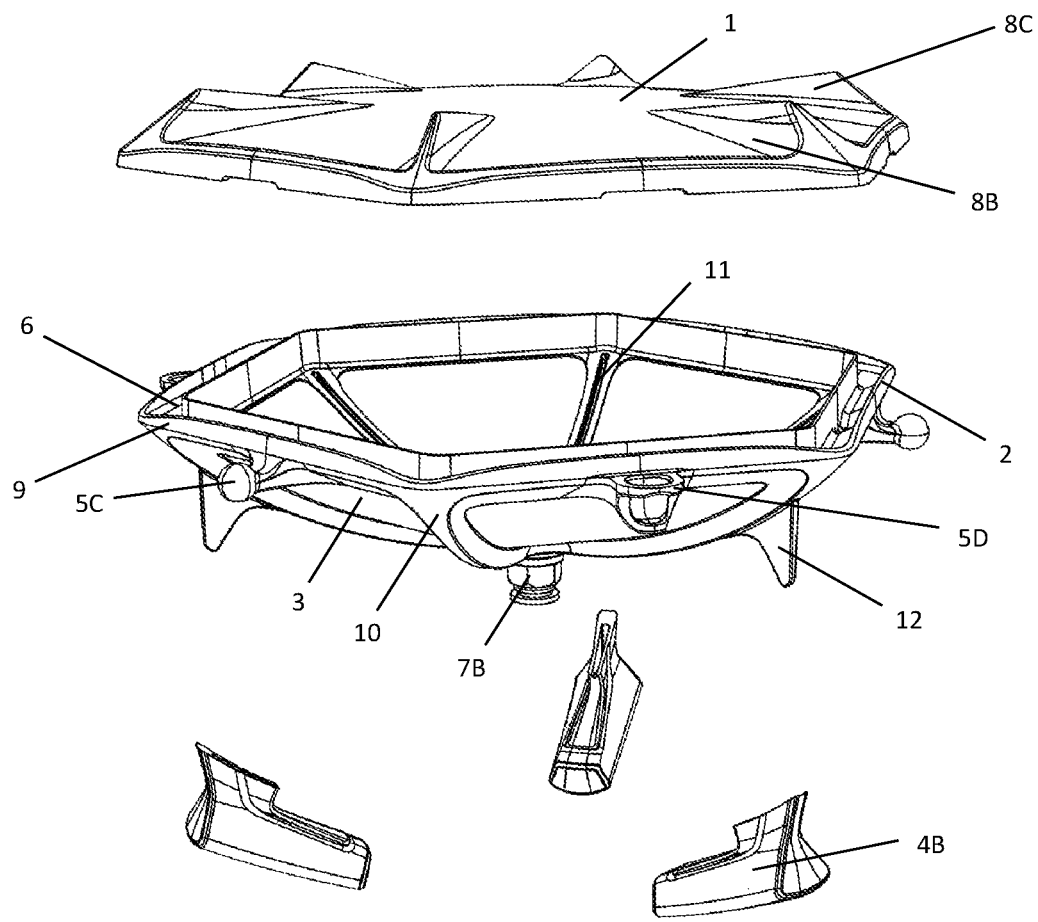

FIG. 22 is a top perspective exploded view of the embodiment by way of example of the phase separator device of FIG. 15.

Figure 23:
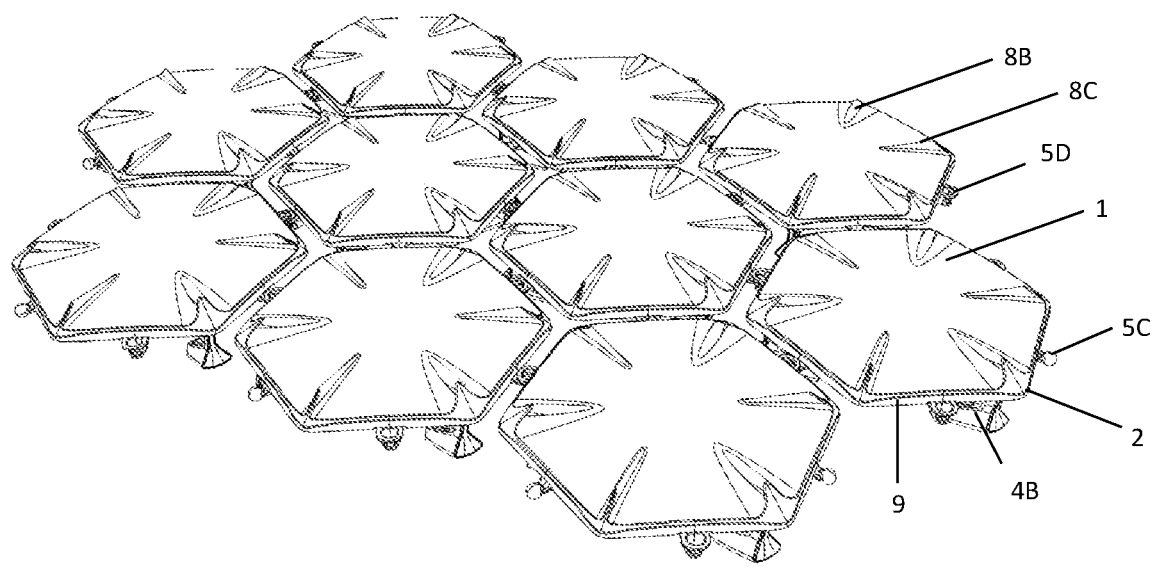

FIG. 23 is a top perspective view of a way of use of the phase separator device of FIG. 15, where ten phase separator devices of FIG. 15 are shown assembled together.

Figure 24:
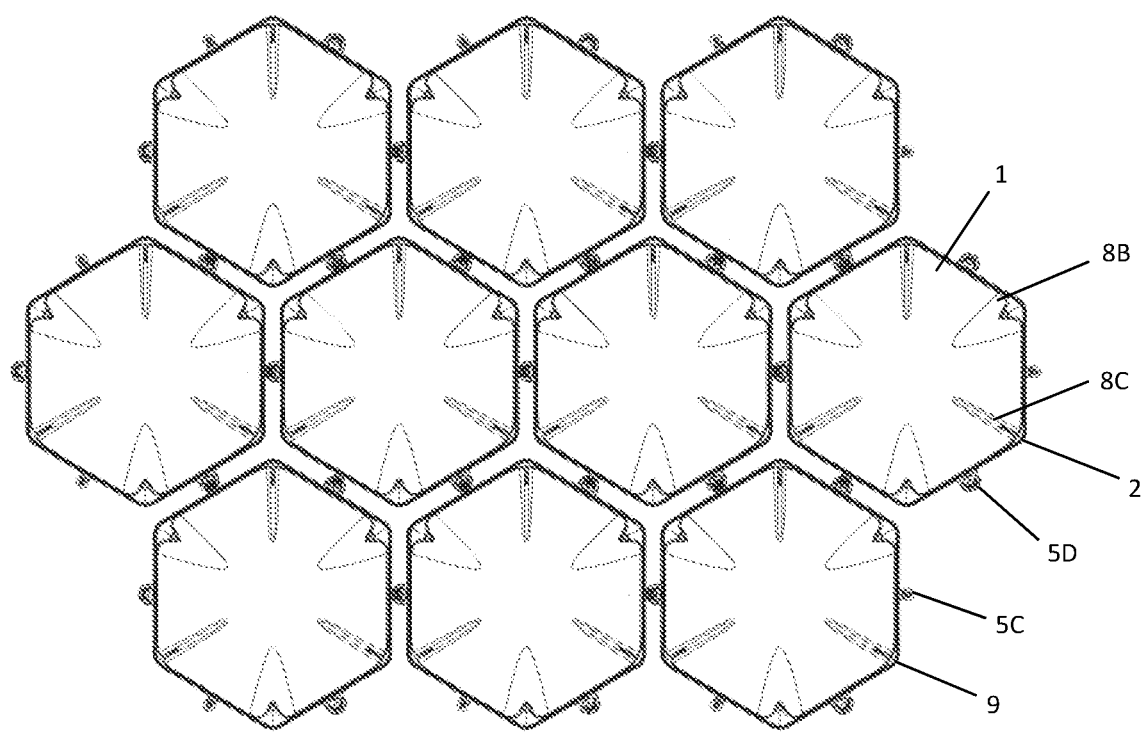

FIG. 24 is a top plan view of the way of use shown in FIG. 23.

Figure 25:
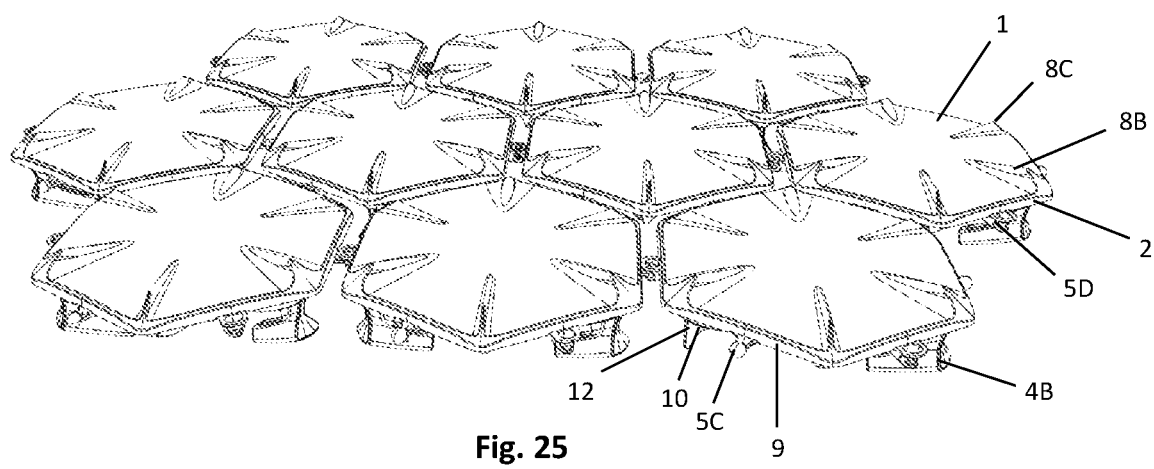

FIG. 25 is another top perspective view of the way of use shown in FIG. 23.

DETAILED DESCRIPTION OF THE INVENTION

The present invention will be described in greater detail below with reference to the appended figures that illustrate embodiments of the invention by way of example which should not be construed as limiting thereof.

For the purposes of the present invention, the terms "oil phase", "oily phase", "organic phase", "water immiscible phase", "oil and/or hydrocarbon derivatives thereof" or derivative terms thereof are used interchangeably to designate a liquid phase that is highly immiscible with water.

FIGS. 1 to 8 show several views of an embodiment of the phase separator device of the present invention, where said device comprises a lid 1, a basket 2, an hydrophobic mesh 3, a plurality of floats 4A, fitting means 5A, 5B, a perimetral housing 6, a discharging means 7A, protrusions 8A, a frame 9 and supporting arms 10.

It can be appreciated in said FIGS. 1 to 8 that the lid 1 has a horizontal cross section of hexagonal shape and, in each of the hexagon vertices, a protrusion 8A on its external surface. The external surface of lid 1 has a convex shape that, in case of rain or splashes, allows the water from the drops to be directed towards the outside of the device. On the other hand, protrusions 8A located on each vertex of the hexagon facilitate the discharge of water from lid 1 preventing said discharged water from interfering directly with floats 4A located under basket 2. In this way, it is possible to keep the device stable (without collapsing) in the event of storms, preventing the entry of water inside the basket.

Lid 1 allows being fitted to basket 2, which is formed by frame 9, which has an upper edge defining an upper opening in the basket, so that said lid 1 closes the opening, and that also has a horizontal cross section of hexagonal shape having, in each of its vertices, supporting arms 10 slightly downwardly curved in a concave manner with respect to lid 1, the supporting arms joining together at the central axis of lid 1 and frame 9, or, what is equivalent, at the central axis of the device. Supporting arms 10 support hydrophobic mesh 3 in a suitable way and position to form an oil receiving concavity of the oil phase separated by hydrophobic mesh 3. Said receiving concavity has a substantially spherical cap shape so as to achieve a better weight distribution of the column of hydrocarbons that accumulate inside said concavity in order to prevent hydrophobic mesh 3 from collapsing and the entry of water inside basket 2. In the central axis of frame 9 is located discharging means 7A through which the separated oil phase, contained in the receiving concavity, will be discharged or evacuated. Preferably discharging means 7A has the shape of an outlet or nozzle directed outwardly of the receiving concavity. In order to facilitate the discharge of the accumulated oil and hydrocarbon derivatives thereof towards discharging means 7A, each supporting arm 10 can have, in a more preferred embodiment, a grooved channel 11 on the inner side of basket 2.

According to this embodiment by way of example, frame 9 of basket 2 also comprises, on each of the outer lateral surfaces thereof, i.e. on each one of the six hexagonal sides, fitting means 5A, 5B which comprise male connectors 5A and female connectors 5B so as to be able to link to other similar or equal phase separator devices, as it will be detailed below when describing another embodiment of the invention. Said male connectors 5A and female connectors 5B are located in an alternate pattern on every one of the six sides so as to comprise a total number of three male connectors 5A and three female connectors 5B in this hexagonal embodiment by way of example. Male connector 5A consists of a protrusion shaped as a solid cylinder while female connector 5B consists of a protrusion shaped as a hollow cylinder with a lengthwise opening, so as to form a hook so as the solid cylinder can snap-fit within the "hook".

Additionally, in the embodiment by way of example, frame 9 of basket 2 comprises in the upper edge a perimetral housing 6 in order to house therein an additional hexagonal float (not shown), so as to keep always floating the device of the present invention, even when due to extraordinary reasons it collapses, so preventing any pieces from dropping to the bottom of the body of water. On the other hand, a plurality of floats 4A are fixed to frame 9 of basket 2. These floats 4A may be fixed by means of special adhesives resistant to the oil phase and to the aqueous phase, or also by a mechanical fitting. In the exemplary case of FIGS. 1 to 8, floats 4A are fixed with a separation of 120°, thus obtaining a total number of three floats 4A, where each one of said floats 4A comprises a curved body with upper and lower horizontal surfaces.

Materials used in all pieces are different grade commercial plastic materials, with excellent resistance to hydrocarbons. The piece surfaces are polished in order to facilitate draining fluids of different densities during use. Floats 4A may be produced from foamed plastic materials with integral skin so as to improve floatability or by means of hollow thermosealed casings.

In this embodiment by way of example, basket 2, is formed as a whole, i.e., fitting means 5A, 5B, hexagonal frame 9 and supporting arms 10, are formed as a single piece by means of a plastic material injection process. During said process of plastic material injection, hydrophobic mesh 3 may be placed on the injection die so that, after the plastic material injection, hydrophobic mesh 3 remains embedded and attached to basket 2, more specifically linked to the thickness of supporting arms 10. Said hydrophobic mesh 3 comprises a metallic mesh coated with an hydrophobic substance like polytetrafluoroethylene or polydimethylsiloxane, so as to obtain excellent separation properties.

The well-known process of injecting plastic material and embedding a metallic mesh guarantees the correct attachment between hydrophobic mesh 3 and the structure of basket 2, since said attachment is produced in the process when the plastic material flows over the die cavity and adheres to hydrophobic mesh 3 already placed within. Therefore, it is also known as overmolding or overinjection. In this way, the use of adhesives or thermoforming processes for attaching hydrophobic mesh 3 is avoided, which would be alternate ways of attaching said parts together.

It should be noted that floats 4A could be over-injected into basket 2, by means of a suitable die, so as to get them attached to basket 2 and avoid separate manufacture and fixing processes.

Figure 9:
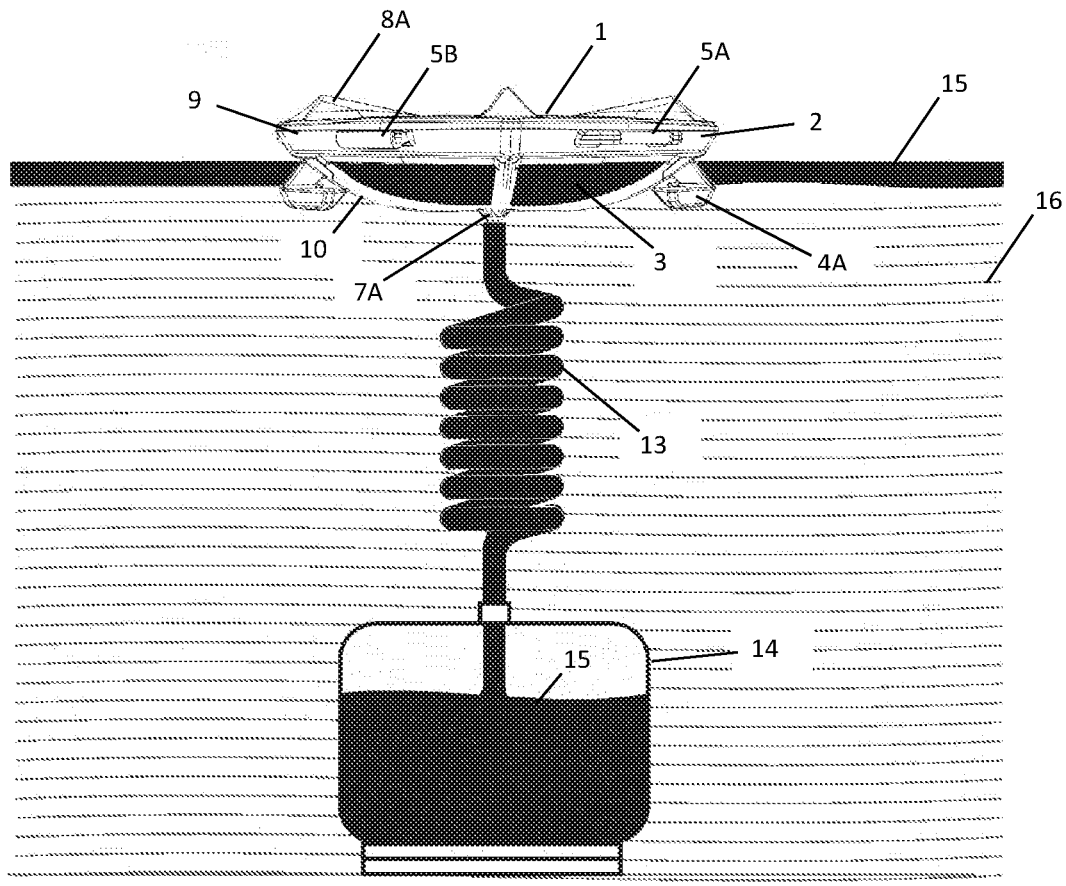
FIG. 9 is a side elevation view of a way of use of the phase separator device of FIG. 1, where the phase separator device of FIG. 1 is shown over a body of water containing an oil phase and discharging the same to a lower tank by means of a hose.

The operation of the phase separator device of FIGS. 1 to 8 may be in an active or a passive way. In the passive way, see FIG. 9, the phase separator device of FIGS. 1 to 8 is placed on the surface of a body of water 16 that contains an oil phase 15 (e.g. pools or any other different spill surface), such as oil and/or hydrocarbon derivatives thereof, necessary to be treated and removed from the body of water 16 so as to let it uncontaminated and environmental damage free, and also with the object of separating and preparing oil and hydrocarbon derivatives thereof for a subsequent refining process. The device will float by itself over said body of water 16 allowing oil phase 15 to enter within it since hydrophobic mesh 3 acts as a filter by blocking the entry of water and allowing the entry of oil phase 15, leading to the accumulation of oil and/or hydrocarbon derivatives thereof within the receiving concavity of basket 2. Oil and/or hydrocarbon derivatives thereof accumulated within basket 2 are evacuated therefrom by means of discharging means 7A, that can be connected to a hose 13 so as to conduct it, by gravity, to a lower water-tight tank 14, properly sized, located under the surface of body of water 16, allowing the collection of oil phase 15 separated by the phase separator device. The active way will be described in greater detail below along with another embodiment of the present invention device.

Figure 10:
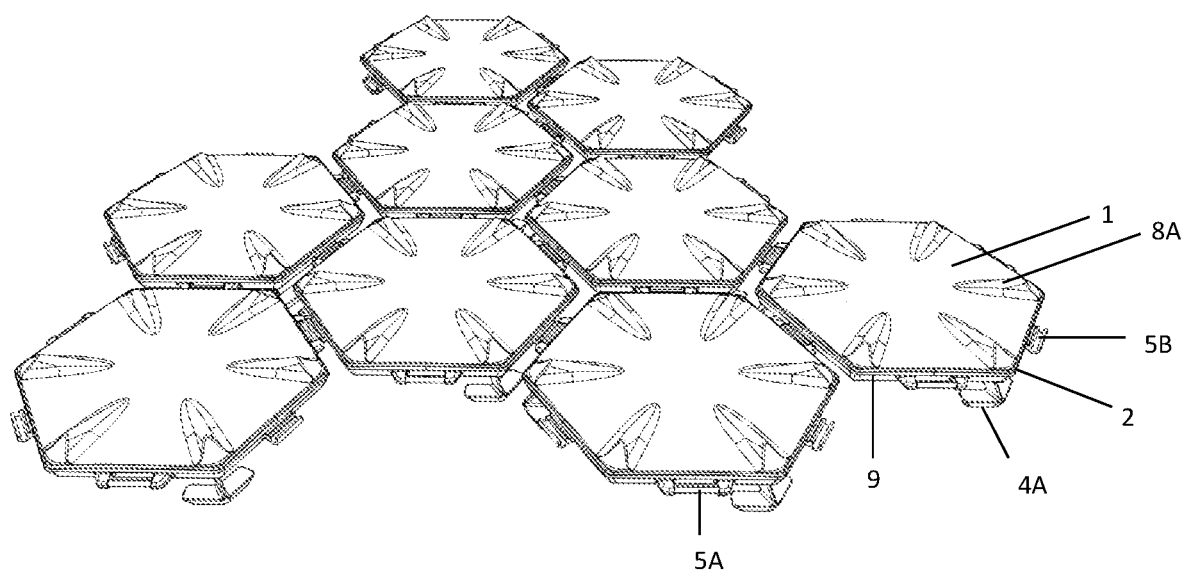
FIG. 10 is a top perspective view of a way of use of the phase separator device of FIG. 1, where nine phase separator devices of FIG. 1 are shown assembled together.
Figure 11:
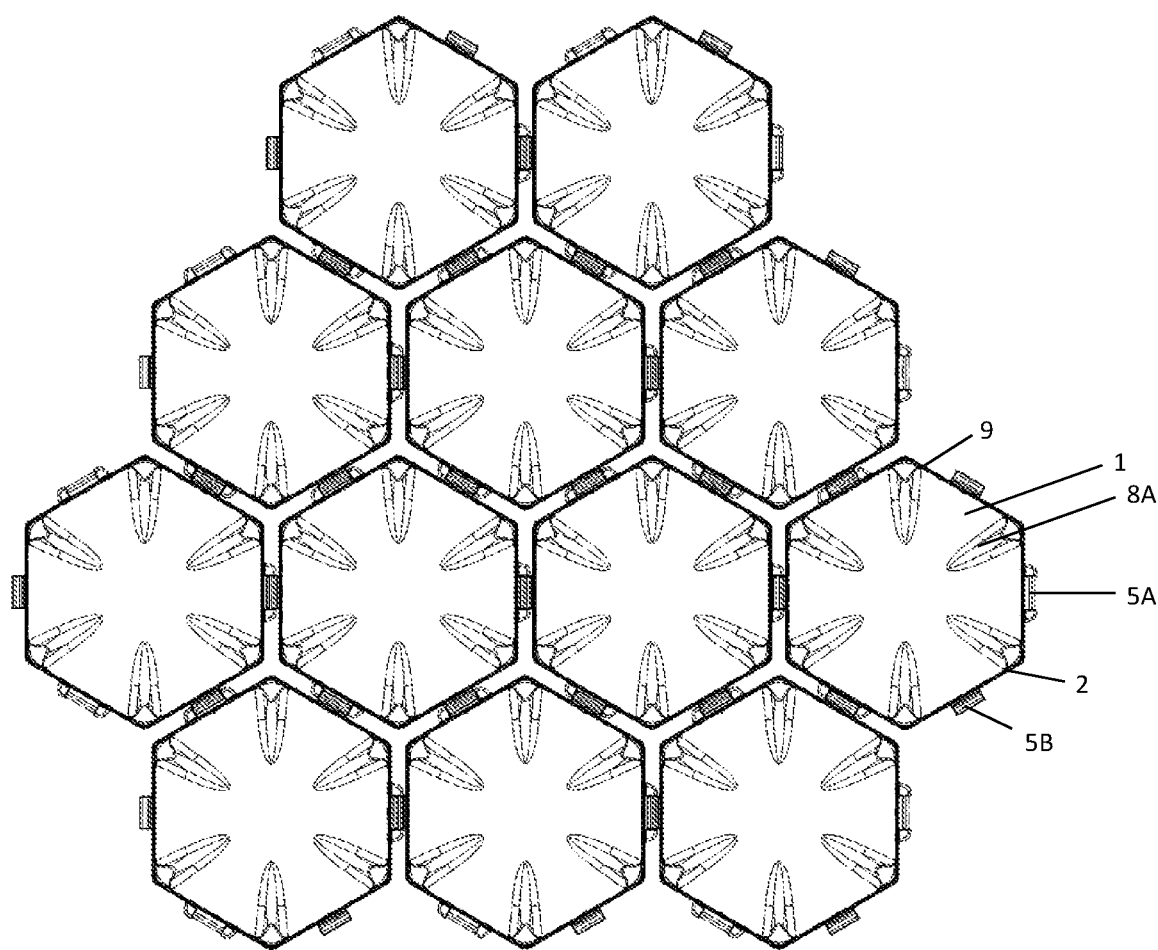
FIG. 11 is a top plan view of a way of use of the phase separator device of FIG. 1, where twelve phase separator devices of FIG. 1 are shown assembled together.
Figure 12:
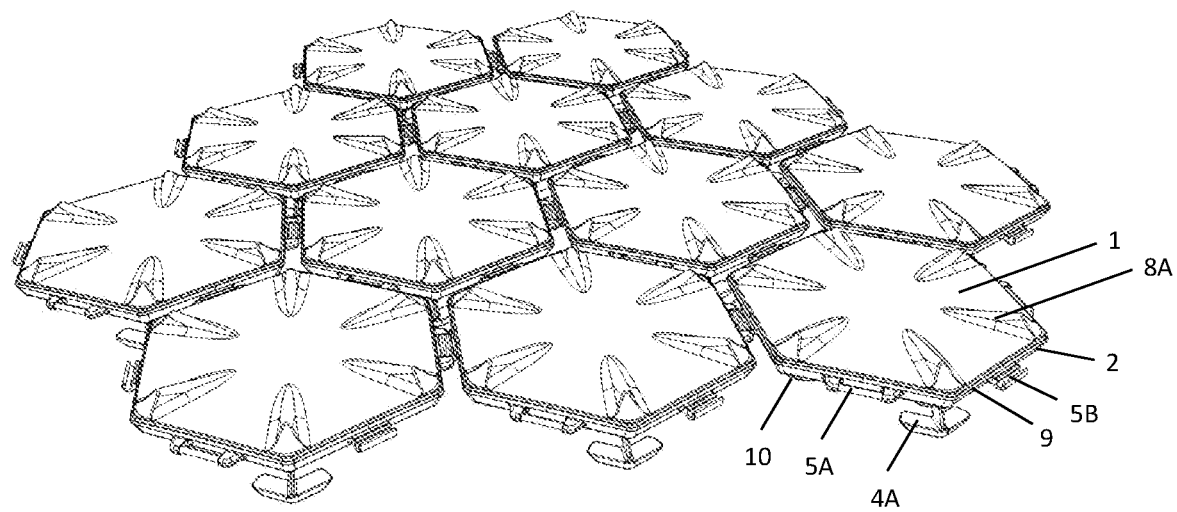
FIG. 12 is a top perspective view of the way of use shown in FIG. 11.

FIGS. 10 to 12 show a way of use of the embodiment of the phase separator device of FIGS. 1 to 8 consisting of a plurality of phase separator devices of the embodiment of FIGS. 1 to 8, assembled or linked together. In said FIGS. 10 to 12 it can be appreciated how the devices can be linked to each other and also how hexagonal shape thereof allows a modular growth by means of fitting means 5A, 5B, by forming interconnected "islets" so as to cover larger body of water surfaces and improve the treatment efficiency thereof. The plurality of devices linked together may comprise any desired or necessary number, e.g. 2, 3, 4, 5, 6, 7, 8, 9, 10, 11 or more separator devices linked together. Said fitting means 5A, 5B create a linear link between separator devices linked together, since male connector 5A is shaped as solid cylinder, so that some or all of the degrees of freedom between them are restricted according to the way the linkage is made, e.g. if the devices are linked in a straight way, they could only move horizontally, normally to the straight line they form and they could vertically pivot regarding the connection with the preceding and subsequent device in the line.

The phase separator device of the present invention, according to the embodiment by way of example, may have different hexagon sizes, according to what is necessary in order to contain an oil spill, since it is easily scalable, e.g. a 1 m² surface of contaminated water may be covered by an islet formed by two bigger separator devices, or by an islet formed by ten smaller separator devices. The phase separator devices are manually assembled together before placing the assembly over the body of water surface, by means of male connectors 5A and female connectors 5B. The assembly is also manually introduced or by means of a mechanical support, designed ad hoc, allowing to place it over the body of water comprising the organic phase to be separated. This way of assembly allows arranging the devices in different ways according to the spill characteristics. As mentioned above, the phase separator devices may be used separated or forming islets, in pairs, in trios, and so forth. If necessary islets can be linked to each other forming a "blanket", (as shown in FIGS. 10 to 12), or if required according to the hydrocarbon collection conditions of the oil spill, they can be linked forming a chain so as to create a containment ring around the spill, among any other possible configurations.

In the way of use shown in FIGS. 10 to 12, the phase separator devices linked together will work in an active or passive way. For the passive way, see FIG. 13, where each of the phase separator devices linked together within pool 19 works as described above for FIG. 9, but having one or more lower tanks 14 into which oil phase 15 is being discharged. For the active way, see FIG. 14, where each of the phase separator devices linked together within pool 19 discharges the oil phase by means of a hose 13 coupled to each discharging means 7A of the devices and a pump 17 coupled to hoses 13 and to a piping 18, so as to draw oil phase 15 accumulated within the separator devices in order to send it to an external tank 20 on the ground surface, and to store the oil phase 15 in said external tank 20. Although not shown, the lower tank mentioned above may be located so as to connect the hoses thereto and then the pump will be connected to the lower tank in order to draw the collected oil phase and send it to the external tank. In this last case, the pump may be manually controlled or it may work automatically controlled by a system that detects the oil phase level in the lower tank, e.g. turning the pump on when the level in the lower tank reaches ¾ of the full tank level and sending the organic phase to the external tank on the ground surface, e.g. for feeding a subsequent hydrocarbon refining process.

It should be noted that the only difference between operation in passive way and operation in active way is the use of a pump for directing the oil phase to an external tank for storage.

FIGS. 15 to 22 show several views of another embodiment of the phase separator device of the present invention, where said device comprises, like the device of the embodiment of FIGS. 1 to 8, a lid 1, a basket 2, an hydrophobic mesh 3, a plurality of floats 4B, fitting means 5C, 5D, a housing 6 for an additional float (not shown), a discharging means 7B, protrusions 8B y 8C, a frame 9, supporting arms 10 and protrusions 12.

This embodiment shows only some structural differences regarding the embodiment of FIGS. 1 to 8, but operating in the same way, both actively and passively.

It can be appreciated in FIGS. 15 to 22 that fitting means 5C, 5D formed by a male connector 5C and a female connector 5D, are substantially different from those disclosed above for the embodiment of FIGS. 1 to 8. Male connector 5C consists of a substantially spheroidal protrusion, while female connector 5D consists of a cavity to house said substantially spheroidal protrusion. On the other hand, lid 1 comprises a protrusion 8B and a protrusion 8C of different size on their outer surface, in an alternate pattern on the hexagon vertices in a similar way to the lid in the embodiment of FIGS. 1 to 8. Some supporting arms 10, in this case, comprise fin-shaped protrusions 12 suitable to fix floats 4B by means of special adhesives resistant to the oil phase and to the aqueous phase or by means of a third element, like a bolt or screw, than can mechanically link floats 4B to protrusions 12 of the basket. Said protrusions 12 are located in an alternate pattern, i.e. on non-adjacent supporting arms 10. In a similar way to the embodiment of FIGS. 1 to 8, floats 4B are fixed with a separation of 120° on the supporting arms 10 resulting in a total number of three floats 4B, wherein each float 4B comprises a downwardly tilted body towards the central axis of the device. Finally, the discharging means 7B operate in the same way than in the embodiment above, but having a broader nozzle, allowing a lower pressure drop.

FIGS. 23 to 25 show a way of use of the embodiment of the phase separator device of FIGS. 15 to 22 consisting of a plurality of phase separator devices of the embodiment de FIGS. 15 to 22, assembled or linked together. In said FIGS. 23 to 25 it can be appreciated how several devices may be linked together and how the hexagonal shape allows a modular growth by means of their fitting means 5C y 5D, forming in this way interconnected "islets" so as to cover large water surfaces and improve the treatment efficiency thereof. The plurality of devices linked together may comprise any desired or necessary number, e.g. 2, 3, 4, 5, 6, 7, 8, 9, 10, 11 or more separator devices. Said fitting means 5C, 5D create a "one-point link" since male connector 5C has a substantially spheroidal shape, allowing connected separator devices a relative motion between them, making them specially suitable for containing oil spills in bodies of water with waves, like the sea, since the wave motion cannot separate connected phase separator devices since the connected phase separator devices can copy the wave motion.

In the way of use shown in FIGS. 23 to 25, the phase separator devices linked together will work in an active or passive way, like in the way of use of FIGS. 10 to 12.

It is to be understood that the features of the various embodiments described herein are not mutually exclusive and may exist in various combinations and permutations, even if said combinations or permutations are not expressly indicated herein, without departing from the spirit and scope of the present description.

The invention claimed is:

1. An oil and aqueous phase separator device, comprising:
a basket comprising a frame having an upper edge defining an upper opening in the basket, the frame comprising a plurality of supporting arms and fitting means for linking to other phase separator devices;
a lid that closes the upper opening of the basket;
an hydrophobic mesh inked to the basket and supported by the plurality of supporting arms;
a plurality of floats connected to the frame of the basket;
a housing for an additional float formed on the upper edge of the frame of the basket;
a discharging means linked to the basket.

2. The device according to claim 1, wherein the lid that closes the upper opening and the frame of the basket comprise a horizontal cross section similarly or equally shaped as a polygon.

3. The device according to claim 2, wherein the plurality of supporting arms comprises a supporting arm at each vertex of the polygon.

4. The device according to claim 3, wherein each supporting arm is slightly downwardly curved forming a concavity with respect to the lid, the supporting arms joining together at the central axis of the device.

5. The device according to claim 4, wherein each supporting arm has an internal grooved channel.

6. The device according to claim 4, wherein the discharging means is located at the central axis of the device, where the supporting arms join together.

7. The device according to claim 3, wherein at least one of the supporting arms comprises a fin-shaped protrusion on its lower surface.

8. The device according to claim 2, wherein at least one of the polygon vertices formed by the frame comprises a float.

9. The device according to claim 8, wherein each one of the plurality of floats comprises a curved body with upper and lower horizontal surfaces.

10. The device according to claim 8, wherein each one of the plurality of floats comprises a downwardly tilted body towards the central axis of the device.

11. The device according to claim 1, wherein the lid that closes the upper opening has an outer convex surface.

12. The device according to claim 1, wherein the lid that closes the upper opening comprises, on the outer surface, a plurality of protrusions.

13. The device according to claim 1, wherein the hydrophobic mesh comprises a metallic mesh coated with an hydrophobic substance.

14. The device according to claim 13, wherein the hydrophobic substance comprises compounds with hydrocarbon chains selected from the group comprising silicones, polyolefins and fluoropolymers.

15. The device according to claim 1, wherein the plurality of supporting arms supports the hydrophobic mesh in a suitable way and position to form an oil phase receiving concavity.

16. The device according to claim 1, wherein the fitting means comprise male connectors and female connectors located each other in an alternate pattern in every one of outer lateral surfaces of the frame of the basket.

17. The device according to claim 16, wherein the male connector consists of a protrusion shaped as a solid cylinder and the female connector consists of a protrusion shaped as a hollow cylinder with a lengthwise opening, so as to form a hook.

18. The device according to claim 16, wherein the male connector consists of a protrusion with substantially spheroidal shape and the female connector consists of a cavity to hold said protrusion.

19. The device according to claim 1, wherein the floats are connected to the basket by means of a mechanical coupling or adhesives resistant to the oil phase and to the aqueous phase.

20. The device according to claim 1, wherein the phase separator device is linked to other similar or equal phase separator devices, by means of the fitting means, so as to form a plurality of phase separator devices linked together, where said plurality may comprise a number of 2, 3, 4, 5, 6, 7, 8, 9, 10, 11 or more phase separator devices.

* * * * *

UNITED STATES PATENT AND TRADEMARK OFFICE
CERTIFICATE OF CORRECTION

PATENT NO.        : 11,103,809 B2
APPLICATION NO.   : 16/969138
DATED             : August 31, 2021
INVENTOR(S)       : Rojas et al.

It is certified that error appears in the above-identified patent and that said Letters Patent is hereby corrected as shown below:

In the Claims

In Column 9, Line 8, change "inked" to --linked--.

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*